United States Patent
Sumi

(10) Patent No.: US 12,014,705 B2
(45) Date of Patent: Jun. 18, 2024

(54) AUDIO ANALYSIS METHOD AND AUDIO ANALYSIS DEVICE

(71) Applicant: Yamaha Corporation, Shizuoka (JP)

(72) Inventor: Kouhei Sumi, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 534 days.

(21) Appl. No.: 17/331,520

(22) Filed: May 26, 2021

(65) Prior Publication Data

US 2021/0287641 A1    Sep. 16, 2021

Related U.S. Application Data

(63) Continuation of application No. PCT/JP2020/000374, filed on Jan. 9, 2020.

(30) Foreign Application Priority Data

Jan. 11, 2019  (JP) ................................. 2019-003324

(51) Int. Cl.
*G10H 1/00* (2006.01)
*G06N 20/00* (2019.01)

(52) U.S. Cl.
CPC .......... *G10H 1/0008* (2013.01); *G06N 20/00* (2019.01); *G10H 2210/056* (2013.01)

(58) Field of Classification Search
CPC . G10H 1/0008; G10H 2210/056; G06N 20/00
USPC ........................................................ 84/609
See application file for complete search history.

(56) References Cited

U.S. PATENT DOCUMENTS

| | | | |
|---|---|---|---|
| 2008/0314231 A1* | 12/2008 | Vorobyev | G10H 1/0008 84/609 |
| 2018/0005614 A1* | 1/2018 | Vilermo | G10H 1/46 |
| 2019/0251941 A1* | 8/2019 | Sumi | G10H 1/0008 |
| 2019/0266988 A1* | 8/2019 | Sumi | G10H 1/383 |
| 2021/0287641 A1* | 9/2021 | Sumi | G06N 20/00 |
| 2021/0287695 A1* | 9/2021 | Sumi | G06F 3/14 |

FOREIGN PATENT DOCUMENTS

| | | | |
|---|---|---|---|
| JP | H07306676 A | * | 11/1995 |
| JP | H07306676 A | | 11/1995 |
| JP | 2007041234 A | * | 2/2007 |
| JP | 2007041234 A | | 2/2007 |
| JP | 2018141899 A | | 9/2018 |

OTHER PUBLICATIONS

Notice of First Examination Opinion in the corresponding Chinese Patent Application No. 202080007107.2, dated Jun. 28, 2023.
Notice of Reasons for Refusal in the corresponding Japanese Patent Application No. 2019-003324, dated Oct. 27, 2022.
(Continued)

*Primary Examiner* — Christina M Schreiber
(74) *Attorney, Agent, or Firm* — Global IP Counselors, LLP

(57) ABSTRACT

An audio analysis method is realized by a computer and includes generating key information which represents a key, by inputting a time series of a feature amount of an audio signal into a learned model that has learned a relationship between keys and time series of feature amounts of audio signals.

14 Claims, 9 Drawing Sheets

(56) References Cited

OTHER PUBLICATIONS

Decision of Refusal in the corresponding Japanese Patent Application No. 2019-003324, dated Apr. 11, 2023.
Kazuyoshi Yoshii, and "Information Science 5 Music and Machine Learning" that Spread centering on Music, Information Processing 57th vol. No. 6, May 15, 2016, and p. 519-522.
International Search Report in PCT/JP2020/000374, dated Mar. 24, 2020.
Duan, Zhiyao et al., Audio Tonality Mode Classification Without Tonic Annotations, [online], ICME 2008, Aug. 26, 2008.

\* cited by examiner

AUDIO ANALYSIS METHOD AND AUDIO ANALYSIS DEVICE

CROSS-REFERENCE TO RELATED APPLICATIONS

This application is a continuation application of International Application No. PCT/JP2020/000374, filed on Jan. 9, 2020, which claims priority to Japanese Patent Application No. 2019-003324 filed in Japan on Jan. 11, 2019. The entire disclosures of International Application No. PCT/JP2020/000374 and Japanese Patent Application No. 2019-003324 are hereby incorporated herein by reference.

BACKGROUND

Technical Field

The present disclosure relates to a technology for analyzing a musical piece.

Background Information

Techniques for estimating various types of information from such sounds as singing sounds or the sounds of a musical piece being performed have been proposed in the prior art. For example, Japanese Laid-Open Patent Application No. 2015-31738 discloses a configuration for estimating chords from audio signals representing a musical piece. Specifically, the key of the musical piece is estimated from the audio signals, and the chords are estimated by taking into consideration the estimated key. In addition, Japanese Laid-Open Patent Application No. 2007-248610 discloses a configuration for specifying the type of tonality from the shape of a power spectrum of a musical piece. The type of tonality is specified in accordance with the power of each pitch name calculated from the time-series data of the power spectrum.

SUMMARY

According to the technology of Japanese Laid-Open Patent Application No. 2015-31738, the key of the musical piece is estimated from the most frequently appearing note. However, there are musical pieces in which the frequency of appearance of the note that corresponds to the key is low. In addition, in the technology of Japanese Laid-Open Patent Application No. 2007-248610, the correlation between the power of each pitch name and the tonality type is used to identify the tonality type. However, there are musical pieces in which the power of each pitch name and the tonality type are not correlated. That is, with the techniques of Japanese Laid-Open Patent Application No. 2015-31738 and Japanese Laid-Open Patent Application No. 2007-248610, it is actually difficult to accurately estimate the key for various types of musical pieces. Given the circumstances described above, an object of this disclosure is to accurately estimate the key.

In order to solve the problem described above, an audio analysis method according to one aspect of this disclosure comprises generating key information which represents a key, by inputting a time series of a feature amount of an audio signal into a learned model that has learned a relationship between keys and time series of feature amounts of audio signals.

An audio analysis device according to one aspect of this disclosure comprises a memory storing a program that realizes a key estimation model, which is a learned model that has learned a relationship between keys and time series of feature amounts of audio signals and that generates key information which represents a key from an input of a time series of a feature amount of an audio signal, and an electronic controller including at least one processor and configured to execute the program to realize the key estimation model.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained in detail below, with reference to the drawings as appropriate. It will be apparent to those skilled in the art from this disclosure that the following descriptions of the embodiments are provided for illustration only and not for the purpose of limiting the invention as defined by the appended claims and their equivalents.

First Embodiment

Figure 1:
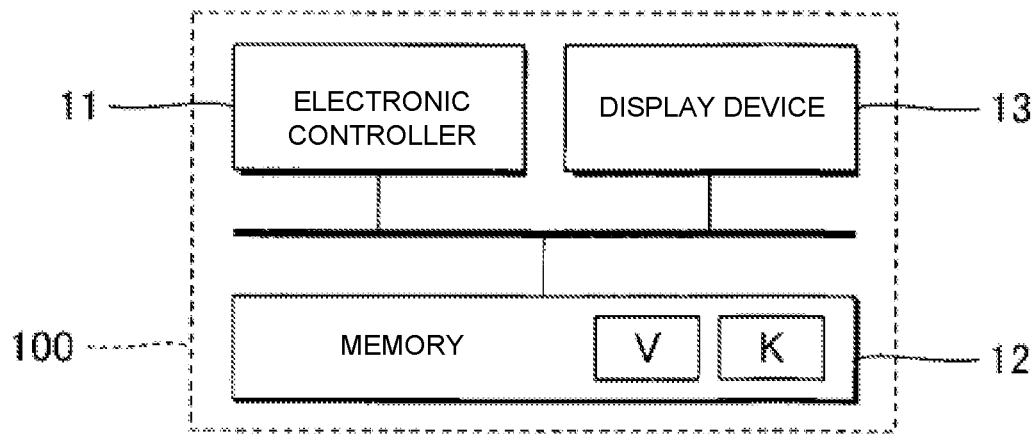
FIG. 1 is a block diagram showing a configuration of an audio analysis device according to a first embodiment.

FIG. 1 is a block diagram illustrating a configuration of an audio analysis device 100 according to a first embodiment of this disclosure. The audio analysis device 100 analyzes an audio signal V representing an audio of singing sounds or the sounds of a musical piece being performed and thus estimates the key of the musical piece. The audio analysis device 100 uses 24 types of keys corresponding to combinations of a plurality of tonics (specifically, 12 semitones of an equally tempered scale) and key names (major or minor) as candidates, and estimates one key thereof from the audio signal V. The number of types of keys is not limited to 24.

The audio analysis device 100 comprises an electronic controller 11, a memory (computer memory, storage device) 12, and a display device (display) 13. For example, an information terminal such as a mobile phone, a smartphone, or a personal computer, can be used as the audio analysis device 100. The display device 13 displays the key estimated from the audio signal V. A display such as a liquid-crystal display panel or an organic EL (Electroluminescent) display panel is suitably used as the display device 13. The display device 13 is one example of a reproduction device that reproduces the result of analyzing the audio signal V. For example, a sound output device, such as a speaker, that outputs audio corresponding to the result of analyzing the audio signal V can be used as the reproduction device.

The electronic controller 11 comprises at least one processor including one or a plurality of processing circuits, such as a CPU (Central Processing Unit) and controls each element of the audio analysis device 100. The term "electronic controller" as used herein refers to hardware that executes software programs. The electronic controller 11 can be configured to comprise, instead of the CPU or in addition to the CPU, programmable logic devices such as a DSP (Digital Signal Processor), an FPGA (Field Programmable Gate Array), and the like. In addition, the electronic controller 11 can include a plurality of CPUs (or a plurality of programmable logic devices). The memory (computer memory, storage device) 12 includes one or a plurality of memory units formed by a known storage medium such as a magnetic storage medium or a semiconductor storage medium, which stores a program that is executed by the electronic controller 11 and various data that are used by the electronic controller 11. The memory 12 can be any computer storage device or any computer readable medium with the sole exception of a transitory, propagating signal. For example, the memory 12 stores the audio signal V. The memory 12 can be formed by a combination of a plurality of types of storage media. A portable storage medium that can be attached to/detached from the audio analysis device 100 or an external storage medium (for example, online storage) with which the audio analysis device 100 can communicate via a communication network can also be used as the memory 12.

Figure 2:
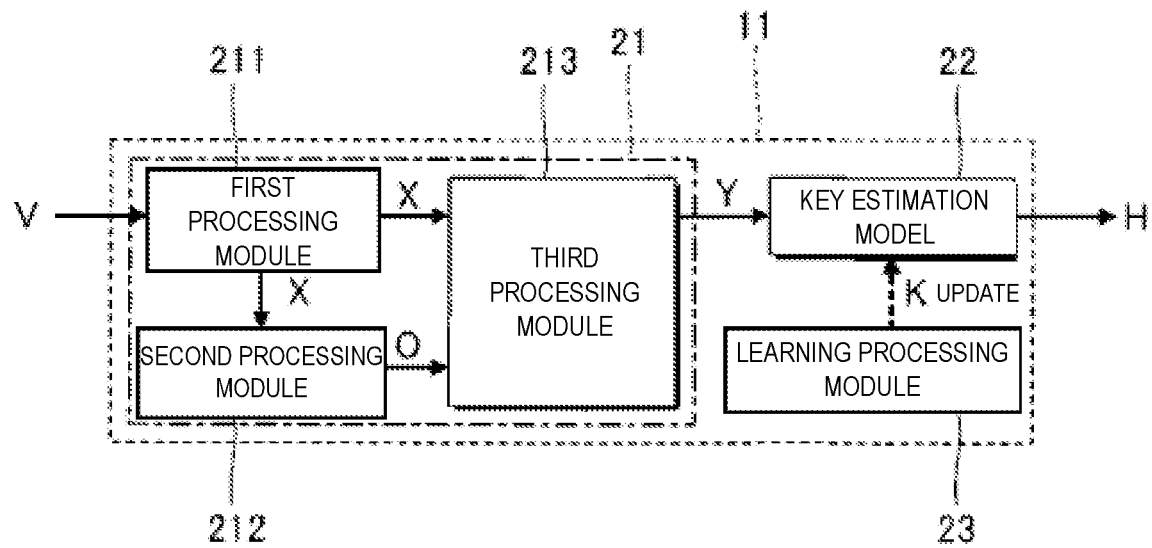
FIG. 2 is a block diagram showing a functional configuration of the audio analysis device.

FIG. 2 is a block diagram showing a function that is realized by the electronic controller 11 when a program that is stored in the memory 12 is executed. The electronic controller 11 executes a plurality of modules including a feature extraction module 21, a key estimation model 22, and a learning processing module 23 to realize a plurality of functions. Moreover, the functions of the electronic controller 11 can be realized by a plurality of discretely configured devices. Some or all of the functions of the electronic controller 11 can be realized by a dedicated electronic circuit.

The feature extraction module 21 extracts a feature amount Y of the audio signal V from the audio signal V stored in the memory 12. The feature extraction module 21 according to the first embodiment comprises a first processing module 211, a second processing module 212, and a third processing module 213.

The first processing module 211 extracts a feature amount X of the audio signal V from the audio signal V. The second processing module 212 estimates a chord O from the feature amount X extracted by the first processing module 211. The third processing module 213 extracts the feature amount Y from the audio signal V. The feature amount Y is an index representing an acoustic feature in consideration of the temporal changes in the audio signal V. For example, the third processing module 213 extracts the feature amount Y from the feature amount X extracted by the first processing module 211 and the chord O estimated by the second processing module 212. A time series of the feature amount Y is input to the key estimation model 22.

The key estimation model 22 is a learned model that has learned the relationship between the time series of feature amounts Y and keys. Specifically, the key estimation model 22 generates information representing one or more keys (hereinafter referred to as "key information H") by inputting time series of one or more feature amounts Y.

Figure 3:
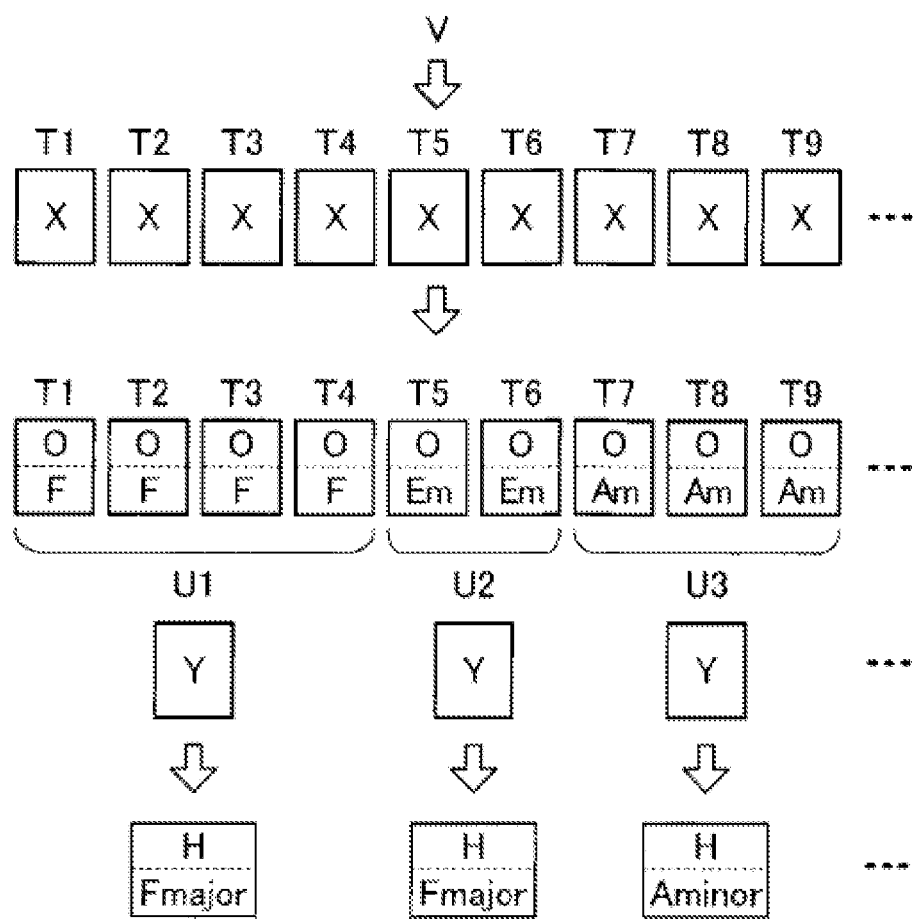
FIG. 3 is a schematic explanatory diagram of feature amounts and key information.

FIG. 3 is an explanatory diagram of feature amounts X, feature amounts Y, and key information H. The feature amount X is extracted for each unit period T (T1, T2, T3, . . . ). The unit period T is a period corresponding to one beat of a musical piece, for example. That is, a time series of the feature amount X is generated from the audio signal V. A fixed-length or variable-length unit period T can be defined independently of the beat points of the musical piece.

The feature amount X is an index representing the acoustic features of a portion of the audio signal V corresponding to each unit period T. The chord O is estimated for each feature amount X (that is, for each unit period T). That is, a time series of the chord O is generated. For example, from among a plurality of feature amounts X with which different chords are associated, the chord associated with the feature amount X most similar to the feature amount X extracted by the first processing module 211 is estimated as the chord O. A statistical estimation model (such as a hidden Markov model or a neural network) that generates the chord O by input of the audio signal V can also be used for the estimation of the chord O.

The feature amount Y is extracted for each of a series of sections (hereinafter referred to as "continuation section") U in which the same chord O estimated by the second processing module 212 continues. The section in which the same chord is estimated by the second processing module 212 is the continuation section U. A plurality of the continuation sections U (U1, U2, U3 . . . ) are estimated in the musical piece. For example, one feature amount Y is extracted from a continuation section U1 (section corresponding to unit periods T1-T4) for which "F" has been estimated as the chord O.

Figure 4:
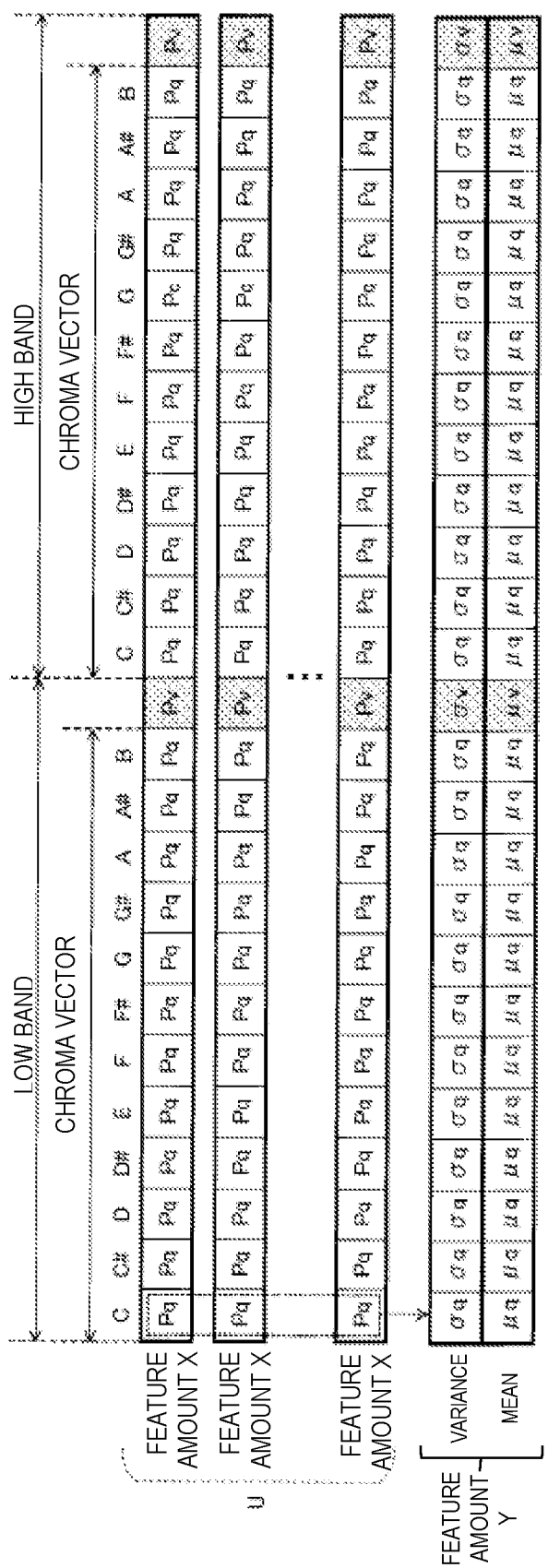
FIG. 4 is an explanatory diagram of feature amounts.

FIG. 4 is a diagram schematically showing the feature amounts X and the feature amounts Y. The feature amount X includes a chroma vector (PCP: Pitch Class Profile), which includes a plurality of elements respectively corresponding to a plurality of scale tones (specifically, 12 semitones of an equally tempered scale) and intensity Pv of the audio signal V. A scale tone is a pitch name that ignores differences in octaves (pitch class). An element corresponding to an arbitrary scale tone in a chroma vector is set to an intensity (hereinafter referred to as "component intensity") Pq obtained by adding the intensity of the component corresponding to the scale tone of the audio signal V over a plurality of octaves. The feature amount X includes the chroma vector and the intensity Pv for each of a frequency band on the lower side and a frequency band on the higher side of a prescribed frequency. That is, the feature amount X includes the chroma vector relating to a lower-side frequency band of the audio signal V and the intensity Pv of the audio signal V within said band, and the chroma vector relating to a higher-side frequency band of the audio signal V and the intensity Pv of the audio signal V within said band. That is, the feature amount X as a whole is represented by a 26-dimensional vector.

The feature amount Y includes variance Gq and mean $1.1q$ relating to a time series of the component intensity Pq for each scale tone, and variance σv and mean μv relating to a time series of the intensity Pv of the audio signal V for each of the lower-side frequency band and the higher-side frequency band. The third processing module 213 calculates the variance Gq and the mean pq of the component intensity Pq included in each of a plurality of feature amounts X in the continuation section U (that is, a time series of the component intensity Pq in the continuation section U), and the variance σv and the mean μv of the intensity Pv included in each of the plurality of feature amounts X in the continuation section U (that is, a time series of the intensity Pv in the continuation section U) in order to extract the feature amount Y. The feature amount Y as a whole is represented by a 52-dimensional vector. As can be understood from the foregoing explanation, the feature amount Y of each continuation section U includes an index (typically, the degree of dispersion, such as the variance Gq) relating to temporal changes in the continuation section U in the component intensity Pq corresponding to the scale tone of the audio signal V.

Figures 5, 6:
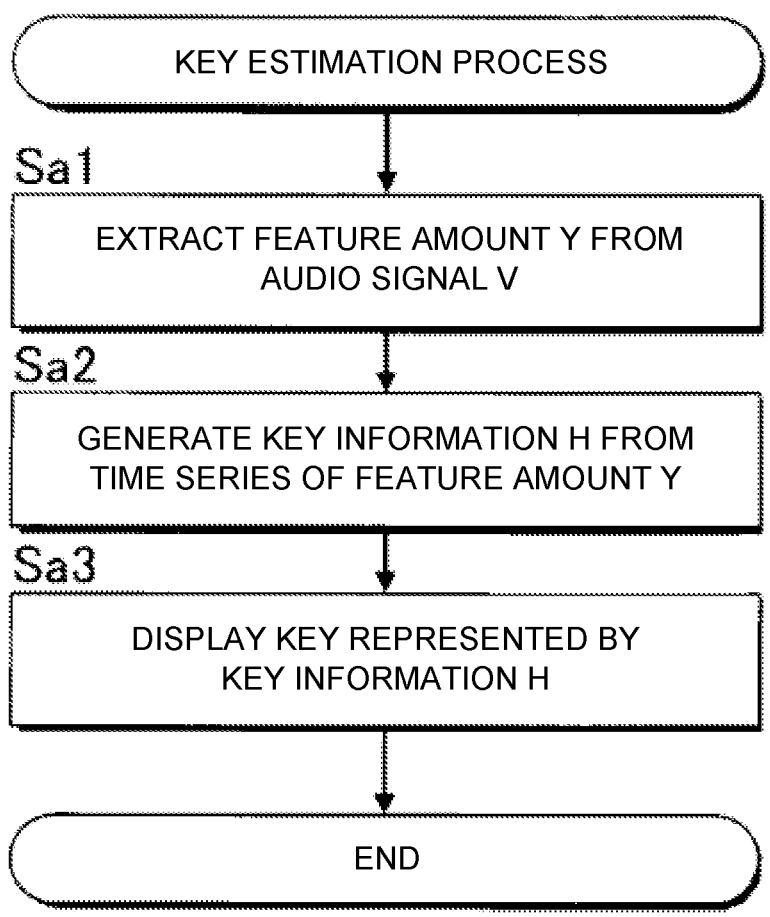
FIG. 5 is an explanatory diagram of the key information.
FIG. 6 is a flowchart showing a specific procedure of a key estimation process.

FIG. 5 is an explanatory diagram of the key information H. The key information H includes indices Q (Q1-Q24) representing whether each of the 24 types of keys, which are candidates of the estimation, corresponds to the key of the continuation section U. For example, an index Q that corresponds to any one key represents whether said key corresponds to the key of the continuation section U in a binary manner. That is, the key information H is information indicating any one of a plurality of keys. The inputting of the feature amount Y into the key estimation model 22 for each continuation section U generates the key information H for each continuation section U. That is, a time series of the key information H is generated by the key estimation model 22. As can be understood from the foregoing explanation, the key estimation model 22 is a statistical estimation model that estimates the key of each continuation section U from the time series of the feature amount Y. That is, a time series of the keys in the musical piece is estimated.

The key estimation model 22 is realized by a combination of a program (for example, a program module constituting artificial intelligence software) that causes the electronic controller 11 to execute computations for generating the key information H from the time series of the feature amount Y, and a plurality of coefficients K that are applied to the computations. The plurality of coefficients K are set by machine learning (particularly, deep learning) that utilizes a plurality of pieces of teacher data and are stored in the memory 12. For example, a recurrent neural network (RNN) such as long short-term memory (LSTM) is used as the key estimation model 22 for processing time-series data.

FIG. 6 is a flowchart illustrating the specific procedure of a process by which the key information H of each continuation section U is estimated from the audio signal V (hereinafter referred to as the "key estimation process"). For example, the key estimation process is initiated by an instruction from a user. When the key estimation process is started, the feature extraction module 21 extracts a feature quantity Y for each continuation section U of the audio signal V stored in the memory 12 (Sa1). The key estimation model 22 generates the key information H from the time series of the feature amount Y extracted by the feature extraction module 21 (Sa2). The electronic controller 11 displays on the display device 13 the key represented by the key information H output from the key estimation model 22 for each continuation section U (Sa3). The content of the display screen showing the result of estimation from the key estimation model 22 is arbitrary. For example, a display screen showing both the time series of the chords estimated by the second processing module 212 and the key estimated by the key estimation model 22 is displayed. The names of chords having the same constituent sounds as the key estimated by the key estimation model 22 can also be displayed. For example, the chord "Gb" is displayed for a continuation section U for which the key "Dbmajor" has been estimated, or a chord "F #" is displayed for a continuation section U for which the key "Bmajor" has been estimated.

Figure 7:
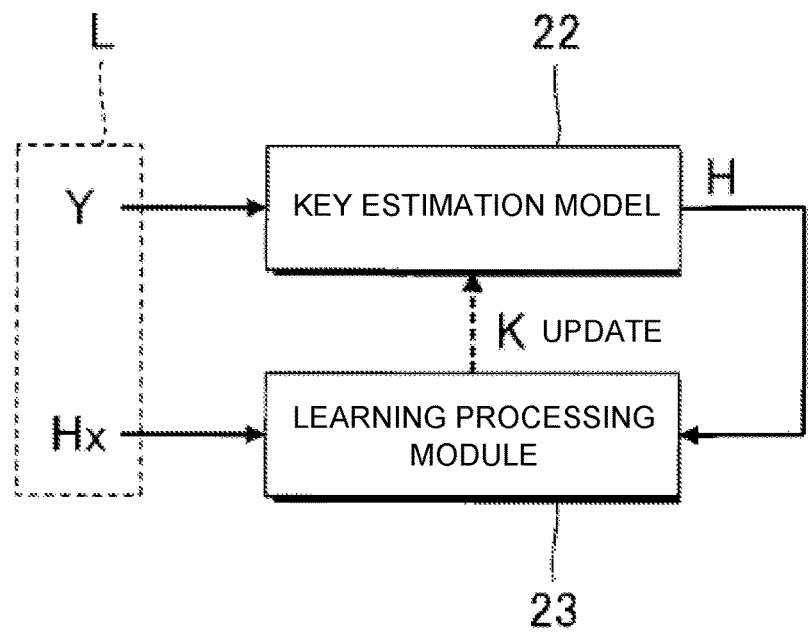
FIG. 7 is an explanatory diagram of an operation of a learning processing module.

The learning processing module 23 sets a plurality of coefficients K of the key estimation model 22 by machine learning (particularly, deep learning). The learning processing module 23 sets the plurality of coefficients K by machine learning that utilizes a plurality of pieces of teacher data L. FIG. 7 is an explanatory diagram of an operation of the learning processing module 23. Each of the plurality of pieces of teacher data L is formed by a combination of a time series of the feature amount Y and a time series of key information Hx. The time-series of the key information Hx of each piece of teacher data L corresponds to the correct answer value with respect to the time series of the feature amount Y in said teacher data L. The teacher data L include the time series of the feature amount Y extracted from the performance sounds of an existing musical piece and the time series of the key information H representing the key of said musical piece.

The learning processing module 23 inputs the time series of the feature amount Y of the teacher data L, in order to update the plurality of coefficients K of the key estimation model 22 so as to reduce the difference between the time series of the key information H that is output from the provisional key estimation model 22 and the key information Hx of the relevant teacher data L. Specifically, the learning processing module 23 iteratively updates the plurality of coefficients K by backpropagation, for example, such that an evaluation function representing the difference between the key information H and the key information Hx is minimized. A plurality of coefficients K set by the learning processing module 23 by the procedure described above are stored in the memory 12. The key estimation model 22 therefore outputs statistically valid key information H with respect to the time series of an unknown feature amount Y under a latent tendency existing between the key information Hx and the time series of the feature amount Y in the plurality of pieces of teacher data L.

As described above, since the key information H is generated by inputting the feature amount Y of the audio signal V into the key estimation model 22, which has learned the relationship between the keys and the feature amounts Y of the audio signal V, the key can be estimated with high accuracy, as compared with a configuration in which the key information H of the musical piece is generated in accordance with a prescribed rule.

Second Embodiment

A second embodiment of this disclosure will now be described. In each of the examples below, elements that have the same functions as in the first embodiment have been assigned the same reference symbols as those used to describe the first embodiment, and detailed descriptions thereof have been appropriately omitted.

The probability that the key of the musical piece will change within a short period of time tends to be low. In the second embodiment, the key estimated in the first embodiment is corrected based on the above-described tendency.

Figure 8:
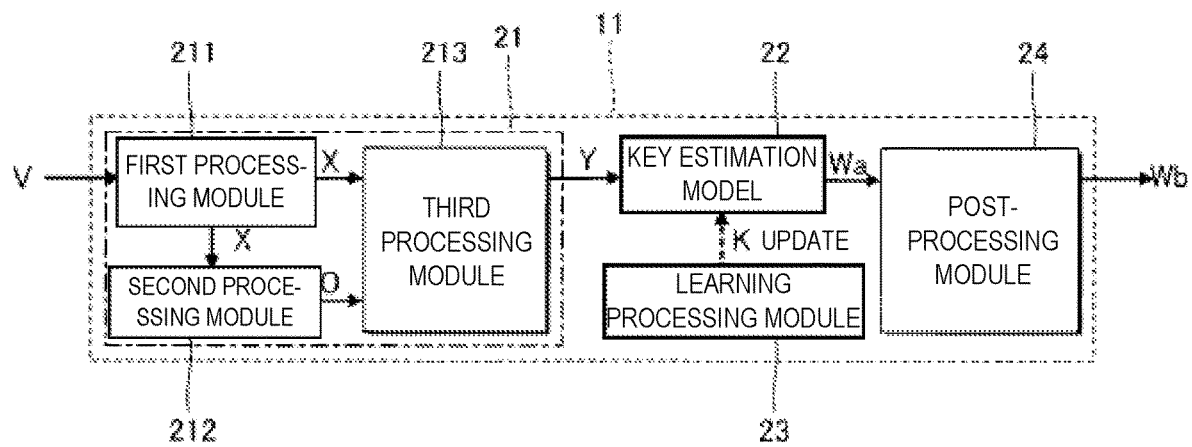
FIG. 8 is a block diagram showing a functional configuration of an audio analysis device according to a second embodiment.
Figure 9:
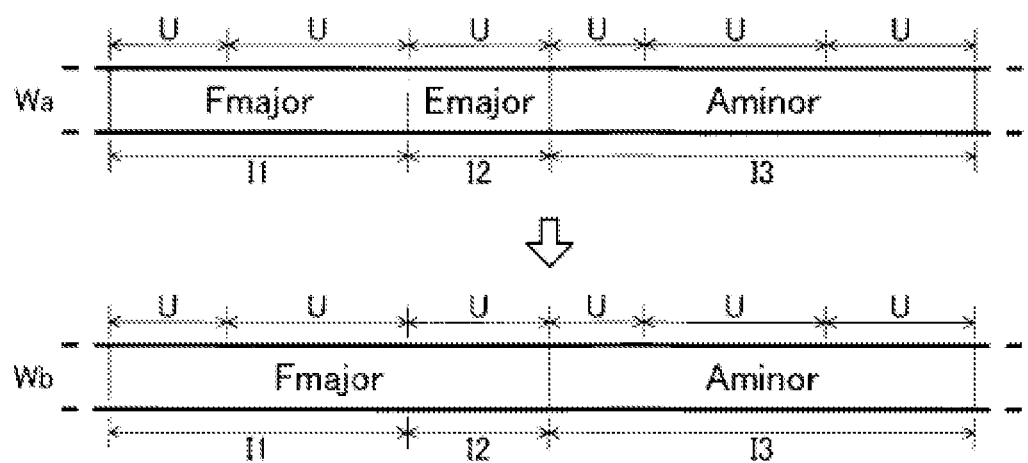
FIG. 9 is an explanatory diagram of a time series of keys adjusted by post-processing according to the second embodiment.

FIG. 8 is a block diagram showing the functional configuration of the audio analysis device 100 according to the second embodiment. The audio analysis device 100 according to the second embodiment is a configuration in which a post-processing module 24 is added to the audio analysis device 100 of the first embodiment. The feature extraction module 21, the key estimation model 22, and the learning processing module 23 are the same as those of the first embodiment. FIG. 9 schematically illustrates a key time series Wa estimated by the key estimation model 22. Key sections I (I1, I2, I3 . . . ) of FIG. 9 are sections in which the keys represented by the key information H generated by the key estimation model 22 continue. As shown in FIG. 9, one key section I includes one or more consecutive continuation sections U for which the same key has been estimated.

The post-processing module 24 corrects the key time series Wa estimated by the key estimation model 22. Specifically, the post-processing module 24 corrects, from among a plurality of the key sections I corresponding to the key time series Wa, the key of a key section I in which the time length is less than a prescribed value, and thereby generates a time series Wb. The prescribed value is, for example, a time length corresponding to three beats of a musical piece. FIG. 9 shows an example in which the key section 12 for which the key "Emajor" has been estimated is less than the prescribed value. When the time length of a key section I is less than the prescribed value, the post-processing module 24 according to the second embodiment replaces the key of the key section I with a key represented by the key information H immediately before the key section I. Specifically, the key "Emajor" of the key section 12 is replaced with the key "Fmajor" represented by the key information H of the continuation section U immediately before the key section 12 (that is, the continuation section U at the end of the key section I1).

Figure 10:
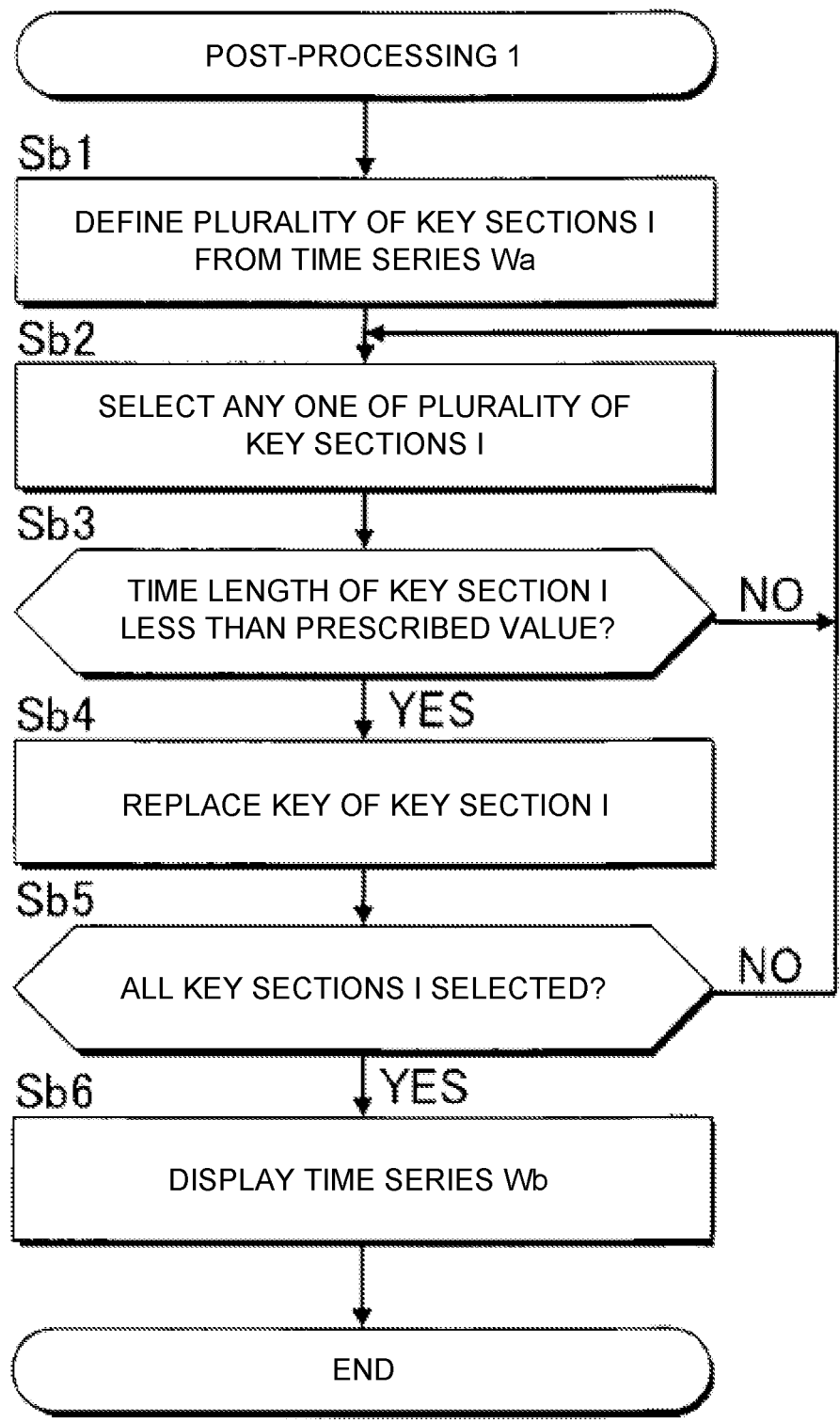
FIG. 10 is a flowchart showing a specific procedure of the post-processing according to the second embodiment.

FIG. 10 is a flowchart showing the specific procedure for a process for correcting the key estimated by the key estimation model (hereinafter referred to as "post-processing 1"). After the key time series Wa is estimated by the key estimation model, the post-processing 1 is initiated by, for example, an instruction from a user. When the post-processing 1 is started, the post-processing module 24 defines a plurality of key sections I (I1, I2, I3 . . . ) from the key time series Wa (Sb1) on the time axis. That is, the time series of the key section I is specified. The post-processing module 24 selects any one of the plural key sections I (Sb2). Specifically, the key section I is sequentially selected from beginning to end. The post-processing module 24 determines whether the time length of the key section I selected in Step Sb2 is less than the prescribed value (Sb3). If the time length of the key section I is less than the prescribed value (Sb3: YES), the post-processing module 24 replaces the key of the key section I with a key represented by the key information H immediately before said key section I (Sb4). However, if the time length of the key section I exceeds the prescribed value (Sb3: NO), the key is not corrected, and the key section I positioned immediately after said key section I is selected (Sb2). When determination of the time length (Sb3) and correction of the key (Sb4) of the key section I shorter than the prescribed value are respectively executed for all of the key sections I (Sb5: YES), the electronic controller 11 causes the display device 13 to display the key time series Wb generated by the post-processing module 24 (Sb6). That is, the display device 13 displays the time series Wb in which, among the plurality of key sections I, the keys have been replaced for all the key sections I for which the time length is less than the prescribed value. On the other hand, if there is an unselected key section I in Step Sb2 (Sb5: NO), the post-processing module 24 repeatedly executes the processes of steps Sb2-Sb4 for the unselected key section I. If the key in the first key section I in the time series of the key sections I is to be replaced, the key is replaced with the key represented by the key information H immediately after said key section I.

The same effect as the first embodiment is realized in the second embodiment. In the second embodiment, when the time length of a key section I, in which the key represented by the key information H is continuous, is less than the prescribed value, the key of the aforementioned key section I is replaced with a key represented by the key information H immediately before said key section I. It is thus possible to appropriately correct the key estimated by the key estimation model in consideration of the tendency that there is a low probability that the key will change in a short period of time. In the second embodiment, the key represented by the key information H of the key section I immediately before what is to be replaced is used as the replacement, but the key represented by the key information H of the key section I immediately after what is to be replaced can also be used as the replacement. In the configuration described above, for example, a key section I is sequentially selected, from the end to the beginning, from among the plurality of key sections I in Step Sb2 of FIG. 10.

Third Embodiment

The chords and the key of a musical piece are correlated. For example, chords formed by the scale tones of the key of the musical piece are played in the musical piece. In particular, the first chord of a section for which a specific key has been set in the musical piece, tends to have a high probability of matching a chord having the tonic of the key as its root note. In the third embodiment, the key estimated in the first embodiment is corrected based on the above-described tendency.

Figure 11:
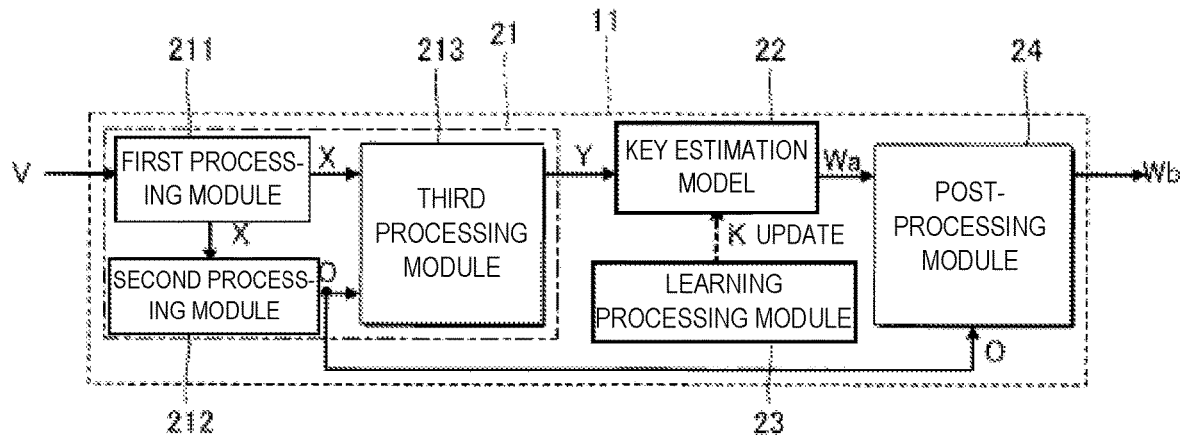
FIG. 11 is a block diagram showing a functional configuration of an audio analysis device according to a third embodiment.
Figure 12:
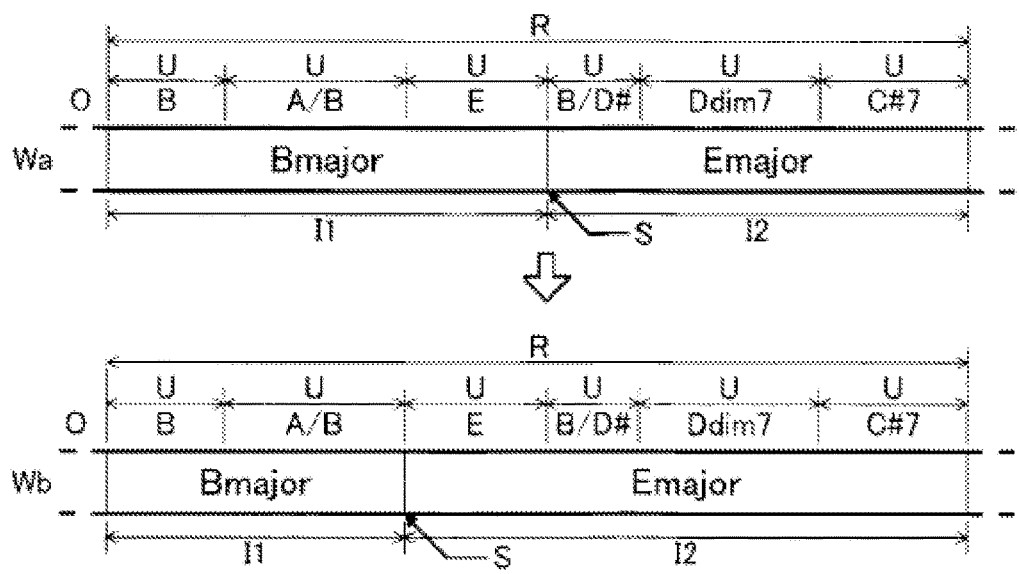
FIG. 12 is an explanatory diagram of a time series of keys adjusted by post-processing according to the third embodiment.

FIG. 11 is a block diagram showing the functional configuration of the audio analysis device 100 according to a third embodiment. The audio analysis device 100 according to the third embodiment comprises the post-processing module 24, in the same manner as in the second embodiment. The post-processing module 24 corrects the key time series Wa estimated by the key estimation model 22 and thereby generates the time series Wb. The post-processing module 24 according to the third embodiment uses a time series of chords O in the audio signal V (for example, the time series of the chords O estimated by the second processing module 212) to generate the time series Wb. FIG. 12 is an explanatory diagram of the time series Wb generated by the post-processing module 24 according to the third embodiment. Specifically, the post-processing module 24 changes an end point of the key section I (specifically, the start point S) in accordance with the time series of the chords O in the audio signal V. When there is a chord corresponding to the key represented by the key information H of a key section I (hereinafter referred to as "key-corresponding chord") in the time series of the chords O of the audio signal V in a section (hereinafter referred to as "search section") R including the start point S of said key section I, the post-processing module 24 of the third embodiment changes the start point S of said key section I to the start point of the section (typically, the continuation section U) corresponding to said key-corresponding chord. As for the search section R, a plurality (six in FIG. 12) of continuation sections U centered around the start point S of the key section I are exemplified as the search section R. A key-corresponding chord is, for example, a chord having the tonic of the key as the root note (typically, a tonic chord). FIG. 12 shows an example in which the start point S of the key section 12 for which "Emajor" has been estimated is changed to the start point of the continuation section U for which the chord "E" has been estimated, among the plurality of chords O estimated for the search section R.

Figure 13:
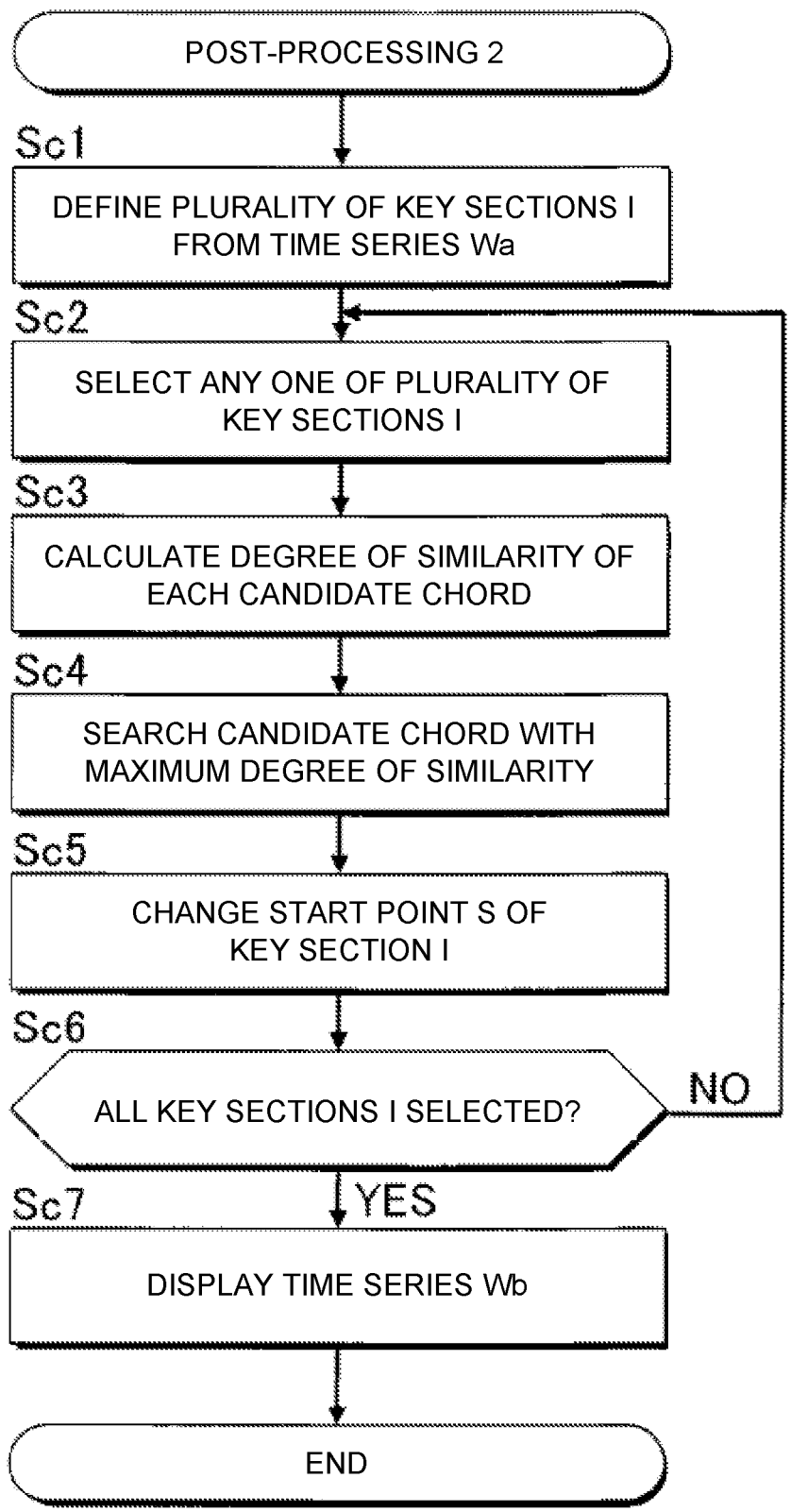
FIG. 13 is a flowchart showing a specific procedure of the post-processing according to the third embodiment.

FIG. 13 is a flowchart showing a specific procedure of a process by which the post-processing module 24 according to the third embodiment corrects the key estimated by the key estimation model (hereinafter referred to as "post-processing 2"). After the key time series Wa is estimated by the key estimation model 22, the post-processing module 24 starts the post-processing 2 initiated by, for example, an instruction from a user. When the post-processing 2 is started, the post-processing module 24 defines a plurality of key sections I from the key time series Wa (Sc1) on the time axis. That is, the time series of the key section I is specified. The post-processing module 24 selects any one of the plural key sections I (Sc2). Specifically, the key section I is sequentially selected from beginning to end.

Next, the post-processing module 24 calculates, for each of a plurality of chords (hereinafter referred to as "candidate chords") estimated for the search section R in the key section I selected in Step Sc2, the degree of similarity between the candidate chord and the key-corresponding chord (Sc3). The degree of similarity is an index representing the distance, or correlation, between a vector representing the key-corresponding chord and a vector representing the candidate chord. An example of a vector representing the key-corresponding chord or the candidate chord is the basic space function described in the literature, "Naohiko Yamaguchi and Noboru Kanmura, Expansion of TPS (Tonal Pitch Space) for the purpose of dealing with chords including non-key constituent notes: aiming at applications to jazz music theory' in Information Processing Society of Japan, Research Report, Feb. 11, 2011." Next, the post-processing module 24 searches a plurality of candidate chords for the candidate chord for which the degree of similarity with the key-corresponding chord becomes maximum (Sc4). Steps Sc3 and Sc4 are processes for searching for one candidate chord that is most similar to (typically, matching) the key-corresponding chord represented by the key of the key section I, from among the plurality of candidate chords of the search section R in said key section I.

The post-processing module 24 changes the start point S of the key section I to the start point of the section corresponding to the candidate chord searched for in Step Sc4 (Sc5). Specifically, the start point S of the key section I is changed to the start point of the continuation section U for which the candidate chord is estimated. When the degree of similarity of the candidate chord at the beginning of the key section I becomes maximum, the start point S of the key section I is kept the same. When the processes of steps Sc2-Sc6 are executed for all of the key sections I (Sc6: YES), the electronic controller 11 causes the display device 13 to display the time series Wb generated by the post-processing module 24 (Sb7). That is, the display device 13 displays the time series Wb in which the start point S has been changed or maintained for each of the plurality of key sections I defined by the time series Wa. On the other hand, if there is an unselected key section I in Step Sc2 (Sb6: NO), the post-processing module 24 repeatedly executes the processes of steps Sc2-Sc6 for the unselected key section I.

The same effects as those of the first embodiment are realized in the third embodiment. In the third embodiment, the end point of the key section I is changed in accordance with the time series of the chords O in the audio signal V, so that it is possible to appropriately correct the key estimated by the key estimation model 22 in consideration of the temporal changes in the chords. In addition, in the third embodiment, when there is a key-corresponding chord whose root note is the tonic of the key represented by the key information H of the key section I in the time series of the chords (that is, the plurality of candidate chords) of the audio signal V in the search section R including the start point S of said key section I, the start point S of said key section I is changed to the start point of the section corresponding to the aforementioned key-corresponding chord. It is therefore possible to appropriately correct the key information H in consideration of the tendency that the beginning of the time series of the chords O of the audio signal V corresponding to the key section I is highly likely to be a chord having the tonic of said key as the root note. The post-processing 1 of the second embodiment and the post-processing 2 of the third embodiment can be combined.

Modified Example

Specific modified embodiments to be added to each of the aforementioned embodiment's examples are illustrated below. A plurality of embodiments selected at random from the following examples can be appropriately combined as long as they are not mutually contradictory.

(1) In the embodiments described above, the audio analysis device 100 provided with the key estimation model 22 and the learning processing module 23 is illustrated as an example, but the learning processing module 23 can be provided in an information processing device (hereinafter referred to as "machine learning device") that is separate from the audio analysis device 100. The key estimation model 22 to which is applied the plurality of coefficients K set by the learning processing module 23 of the machine learning device is transferred to the audio analysis device 100 and used for the generation of the key information H. As can be understood from the foregoing explanation, the learning processing module 23 can be omitted from the audio analysis device 100.

(2) It is also possible to realize the audio analysis device 100 with a server device that communicates with information terminals, such as, mobile phones and smartphones. For example, the audio analysis device 100 generates, and transmits to an information terminal, the key information H by analysis of the audio signal V received from the information terminal. In a configuration in which the feature extraction module 21 that extracts the feature amount Y from the audio signal V is provided in the information terminal, the audio analysis device 100 generates the key information H by inputting into the key estimation model 22 the time series of the feature amount Y received from the information terminal, and sends said key information H to the information terminal. As can be understood from the foregoing explanation, the feature extraction module 21 can be omitted from the audio analysis device 100.

(3) In the embodiments described above, for example, a time series of known chords O specified in a musical score of a musical piece can be used for the extraction of the feature amount Y. The third processing module 213 generates the feature amount Y from the feature amount X extracted by the first processing module 211 and the time series of the known chords O. That is, the second processing module 212 can be omitted. In the configuration described above, the display device 13 displays a display screen showing both the time series of the known chords O and the key estimated by the key estimation model 22. The time series of the known chords O is stored in the memory 12 in advance.

(4) In the embodiments described above, the feature amount Y for each continuation section U is input to the key estimation model 22 and the key information H for each of the said continuation sections U is thereby generated, but the input and output with respect to the key estimation model 22 are not limited to the examples illustrated above. For example, the following configurations [A] to [D] can be employed.

[A] The time series of the feature amount X for each unit period T generated by the first processing module 211 is input to the key estimation model 22 and the key information H for each said unit period T is thereby generated. That is, the key estimation model 22 learns the relationship between the key information H and the time series of the feature amount X. The second processing module 212 and the third processing module 213 are omitted.

[B] The time series of the feature amount X for each unit period T generated by the first processing module 211, and the time series of chords O for each unit period T generated by the second processing module 212 are input into the key estimation model 22, and the key information H for each said unit period T is thereby generated. That is, the key estimation model 22 learns the relationship between the key information H, and the time series of the feature amount X and the time series of the chords O. The third processing module 213 is omitted.

[C] The time series of chords O for each unit period T generated by the second processing module 212 can be input to the key estimation model 22 in order to generate the key information H for each unit period T. That is, the key estimation model 22 learns the relationship between the key information H and the time series of the chords O. The third processing module 213 is omitted. In [B] and [C], for example, a time series of chords O generated from a known musical score of a musical piece can be used as an input for the key estimation model 22.

[D] The time series of the feature amount X for each unit period T generated by the first processing module 211 and data representing a time series of a continuation section U (hereinafter referred to as "section data") are input to the key estimation model 22 and the key information H for each continuation section U is thereby generated. That is, the key estimation model 22 learns the relationship between the key information H, and the time series of the feature amount X and the section data. The third processing module 213 is omitted. The section data are data indicating boundaries of the continuation section U, for example, and can be generated from the time series of chords O generated by the second processing module 212, or section data generated from a known musical score of a musical piece can be used therefor, for example.

As can be understood from the foregoing explanation, the input and output with respect to the key estimation model 22 are arbitrary. The input and output units can be appropriately changed in accordance with the input type. Examples are inputs and outputs for each unit period T or each continuation section U. In addition, the configuration of the feature extraction module 21 can be appropriately changed in accordance with the input to the key estimation model 22.

(5) In the embodiments described above, the key information H including the index Q, which represents any one of a plurality of types of keys in a binary manner is illustrated as an example, but the content of the key information H is not limited to the example described above. For example, it is also possible to use key information H in which an index Q corresponding to each key represents the likelihood that the key of the musical piece will correspond to said key. The index Q representing the likelihood is set to a numerical value within a range of greater than or equal to 0 and less than or equal to 1, and the sum of the indices Q over all of the keys, each corresponding to different keys, becomes a prescribed value (for example, 1). In addition, the key estimation model 22 can generate identification information for identifying any of a plurality of types of keys as the key information H.

(6) In the embodiments described above, the feature amount X that includes the chroma vector and the intensity Pv is illustrated as an example, but the content of the feature amount X is not limited to the example described above. For example, the chroma vector can be used alone as the feature amount Y. In addition, the feature amount X including the chroma vector and the intensity Pv for each of a frequency band on the lower side and a frequency band on the higher side of a prescribed frequency from among the audio signal V is illustrated as an example, but a feature amount X that includes the chroma vector and the intensity Pv for the entire frequency band in the audio signal V can be generated as well. Similarly, the feature amount Y can include the variance Gq and mean $1.1q$ relating to a time series of the component intensity Pq for each scale tone, and the variance σv and mean μv relating to a time series of the intensity Pv of the audio signal V for the entire frequency band of the audio signal V.

(7) In the post-processing 2 of the third embodiment, structural sections in the musical structure of the musical piece corresponding to the audio signal V (for example, phrases such as the A-section, chorus, and B-section, etc.) can be taken into consideration. For example, keys tend to change for each structural section. Utilizing the above-described tendency, for example, when a start point of a structural section is positioned within a search section R in a key section I, the start point S of the key section I can be changed to the start point of said structural section.

(8) In the embodiments described above, a key representing the key information H generated by the key estimation model 22 is displayed, but the use of the key information H is not limited to the example described above. If the chord displayed by the display device 13 (chord estimated by the second processing module 212) is, for example, a chord that is difficult for a user to play, there are circumstances in which said chord is desired to be changed to a simple chord. In light of such circumstances, a key estimated by the key estimation model 22 can be used to specify a plurality of chords as candidates of the chord change by the user. Taking into account the key estimated by the key estimation model 22, a plurality of acoustically similar chords are specified as the candidates of the chord change.

(9) In the embodiments described above, the key estimation model estimates the key in equal temperament, but the temperament as the basis for the key estimated by the key estimation model is not limited to equal temperament. For example, keys in a temperament of folk music, such as Indian music, can be estimated by the key estimation model.

(10) The audio analysis device 100 according to each of the above-described embodiments is realized by cooperation between a computer (specifically, the electronic controller 11) and a program, as is illustrated in each of the embodiments. The program according to each of the above-described embodiments can be stored on a computer-readable storage medium and installed on a computer. The storage medium is, for example, a non-transitory (non-transitory)

storage medium, a good example of which is an optical storage medium, such as a CD-ROM (optical disc), but can include known arbitrary storage media, such as a semiconductor storage medium or a magnetic storage medium. Non-transitory storage media include any storage medium that excludes transitory propagating signals and does not exclude volatile storage media. Furthermore, it is also possible to deliver the program to a computer in the form of distribution via a communication network.

The means for executing the program for realizing the key estimation model 22 is not limited to a general-purpose processing circuit, such as a CPU. For example, a processing circuit specifically designed for artificial intelligence applications, such as a Tensor Processing Unit or a Neural Engine, or an electronic circuit for signal processing (DSP: Digital Signal Processor) can also execute the program. In addition, a plurality of types of implementation means selected from the examples described above can be used in collaborative fashion to execute the program.

(11) The learned model (key estimation model 22) is a statistical estimation model (for example, a neural network) that is realized by an electronic controller (exemplified by a computer), and generates an output B in accordance with an input A. More specifically, the trained model is realized by a combination of a program (for example, a program module constituting artificial intelligence software) that causes the electronic controller to execute a computation to specify the output B from the input A, and a plurality of coefficients that are applied to the computation. The plurality of coefficients of the learned model are optimized by machine learning (deep learning) in advance, utilizing a plurality of pieces of teacher data in which the input A and the output B are mutually associated. That is, the learned model is a statistical estimation model that has learned the relationship between the input A and the output B. The electronic controller executes a computation to which the plurality of learned coefficients and a prescribed response function with respect are applied to an unknown input A, and thereby generates an output B that is statistically valid with respect to the input A, under the latent tendency in a plurality of pieces of teacher data (relationship between the input A and the input B).

(12) For example, the following configurations can be understood from the embodiments exemplified above.

An audio analysis method according to a first aspect of this disclosure comprises inputting a time series of a feature amount of an audio signal into a learned model that has learned the relationship between keys and the time series of feature amounts of audio signals, thereby generating key information which represents the key. By the aspect described above, since the key information representing the key is generated by inputting the feature amount of the audio signal into the learned model, which has learned the relationship between the keys and the feature amounts of the audio signal, the key can be estimated with high accuracy, as compared with a configuration in which the key information of the musical piece is generated in accordance with a prescribed rule.

In one example (second aspect) of the first aspect, a feature amount of the audio signal is input into the learned model for each continuation section in which the same chord continues, thereby generating the key information for each continuation section. By the aspect described above, the feature amount of the audio signal is input to the learned model for each continuation section in which the same chord continues, thereby generating the key information for each continuation section, so that it is possible to estimate the key information with high accuracy, taking into account the tendency that the key does not change in a continuation section in which the same chord continues.

In one example (third aspect) of the second aspect, the feature amount of each continuation section includes, for each scale tone, an index relating to temporal changes in the continuation section in a component intensity corresponding to a scale tone of the audio signal. By the aforementioned aspect, since the feature amount including, for each scale tone, an index relating to temporal changes in the continuation section in the component intensity corresponding to the scale tone of the audio signal is input into the learned model for each continuation section, it is possible to estimate the key information with high accuracy, taking into account the temporal changes in the audio signal.

In one example (fourth aspect) of the first aspect, the feature amount includes, for each scale tone, a component intensity obtained by adding the component intensity corresponding to a scale tone of the audio signal over a plurality of octaves. By the aspect described above, since the feature amount including, for each scale tone, a component intensity obtained by adding the component intensity corresponding to a scale tone of the audio signal over a plurality of octaves is input into the learned model, there is the advantage that it is possible to estimate the key information with high accuracy, using a feature amount that appropriately reflects the chords of the musical piece represented by the audio signal.

In one example (fifth aspect) of any one of the first to the fourth aspects, when a time length of a key section, in which the key represented by the key information is continuous, is less than a prescribed value, the key of said key section is replaced with a key represented by the key information immediately before or after said key section. By the aspect described above, when the time length of a key section, in which the key represented by the key information is continuous, is less than a prescribed value, the key of said key section is replaced with a key represented by the key information immediately before or after said key section. It is therefore possible to appropriately correct the key estimated by the learned model, taking into account the tendency that the probability that the key will change in a short period of time is low.

In one example (sixth aspect) of any one of the first to the fifth aspects, an end point of a key section in which the key represented by the key information is continuous is changed in accordance with a time series of chords in the audio signal. By the aspect described above, since an end point of a key section in which the key represented by the key information is continuous is changed in accordance with a time series of chords in the audio signal, it is possible to appropriately correct the key estimated by the learned model, taking the temporal changes in the chords into account.

In one example (seventh aspect) of the sixth aspect, when there is a chord whose root note is the tonic of a key represented by the key information of the key section in a time series of chords of an audio signal in a search section including a start point of the key section, the start point of the key section is changed to a start point of a section corresponding to said chord. By the aforementioned aspect, when there is a chord that is acoustically similar to (ideally, that matches) a chord whose root note is the tonic of a key represented by the key information of the key section in a time series of chords of an audio signal in a search section including a start point of the key section, the start point of the key section is changed to the start point of the section corresponding to said chord. Therefore, it is possible to appropriately correct the key information by taking into account the tendency that the beginning of the time series of the chords of the audio signal corresponding to the key section is highly likely to be a chord that is acoustically similar to (ideally, that matches) a chord whose root note is the tonic of the relevant key.

An audio analysis device according to an aspect (eighth aspect) of this disclosure comprises a memory that stores a program that realizes a key estimation model, which is a learned model that has learned the relationship between keys and time series of feature amounts of audio signals, that generates key information which represents the key from an input of a time series of a feature amount of an audio signal, and an electronic controller that executes the program to thereby realize the key estimation model. By the aspect described above, since the key information representing the key is generated by inputting the feature amount of the audio signal into the learned model, which has learned the relationship between the keys and the feature amounts of the audio signal, the key can be estimated with high accuracy, as compared with a configuration in which the key information of the musical piece is generated in accordance with a prescribed rule.

What is claimed is:

1. An audio analysis method realized by a computer, the audio analysis method comprising:
   generating key information which represents a key, by inputting a time series of a feature amount of an audio signal into a learned model that has learned a relationship between keys and time series of feature amounts of audio signals,
   the key information being generated for each of a plurality of continuation sections, each of which is a section in which a same chord of the audio signal continues, by inputting the feature amount of the audio signal into the learned model for each of the plurality of continuation sections.

2. The audio analysis method according to claim 1, wherein
   the feature amount of each of the plurality of continuation sections includes an index for each of a plurality of scale tones of the audio signal, the index is relating to temporal changes, in each of the plurality of continuation sections, in a component intensity which corresponds to each of the plurality of scale tones and is set to each of the plurality of scale tones in a chroma vector for the audio signal.

3. The audio analysis method according to claim 1, wherein
   the feature amount includes, for each of a plurality of scale tones of the audio signal, a component intensity obtained by adding, over a plurality of octaves, the component intensity that corresponds to each of the plurality of scale tones and is set to each of the plurality of scale tones in a chroma vector for the audio signal.

4. The audio analysis method according to claim 1, further comprising
   upon determining that a time length of a key section, in which a same key represented by the key information is held for a determined amount of time, is less than a prescribed value, replacing the same key of the key section with a key represented by the key information immediately before or after the key section.

5. The audio analysis method according to claim 1, further comprising
   changing one end point of a key section in which a same key represented by the key information is held for a determined amount of time, in accordance with a time series of chords in the audio signal.

6. The audio analysis method according to claim 5, wherein
   in response to presence of a chord in the time series of the chords, which has a root note that is a tonic of the same key represented by the key information of the key section in a search section that is a section for searching the presence of the chord and includes a start point of the key section, the start point of the key section, as the one end point of the key section, is changed to a start point of a section corresponding to the chord.

7. The audio analysis method according to claim 1, wherein
   the audio signal represents a musical piece.

8. An audio analysis device comprising:
   a memory storing a program that realizes a key estimation model, which is a learned model that has learned a relationship between keys and time series of feature amounts of audio signals and that generates key information which represents a key from an input of a time series of a feature amount of an audio signal; and
   an electronic controller including at least one processor, the electronic controller being configured to execute the program to realize the key estimation model,
   the electronic controller being configured to generate the key information for each of a plurality of continuation sections, each of which is a section in which a same chord of the audio signal continues, by inputting the feature amount of the audio signal into the learned model for each of the plurality of continuation sections.

9. The audio analysis device according to claim 8, wherein
   the feature amount of each of the plurality of continuation sections includes, an index for each of a plurality of scale tones of the audio signal, the index is relating to temporal changes, in each of the plurality of continuation sections, in a component intensity which corresponds to each of the plurality of scale tones and is set to each of the plurality of scale tones in a chroma vector for the audio signal.

10. The audio analysis device according to claim 8, wherein
    the feature amount includes, for each of a plurality of scale tones of the audio signal, a component intensity obtained by adding, over a plurality of octaves, the component intensity that corresponds to a scale tone of each of the plurality of scale tones and is set to each of the plurality of scale tones in a chroma vector for the audio signal.

11. The audio analysis device according to claim 8, wherein
    upon determining a time length of a key section, in which a same key represented by the key information is held for a determined amount of time, is less than a prescribed value, the electronic controller is configured to replace the same key of the key section with a key represented by the key information immediately before or after the key section.

12. The audio analysis device according to claim 8, wherein
    the electronic controller is configured to change one end point of a key section in which a same key represented by the key information is held for a determined amount of time, in accordance with a time series of chords in the audio signal.

13. The audio analysis device according to claim 12, wherein in response to presence of a chord in the time series of the chords, which has a root note that is a tonic of the same key represented by the key information of the key section in a search section that is a section for searching the presence of the chord and includes a start point of the key section, the electronic controller is configured to change the start point of the key section, as the one end point of the key section, to a start point of a section corresponding to the chord.

14. The audio analysis device according to claim 8, wherein
the audio signal represents a musical piece.

* * * * *